July 16, 1957     A. LIEB     2,799,790
MULTI-RANGE VOLTAGE INDICATING VALVE
Filed May 16, 1952
Fig. 1
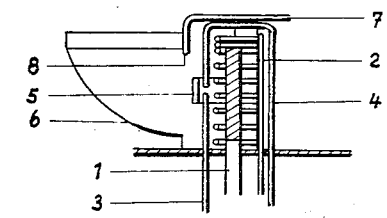
Fig. 3
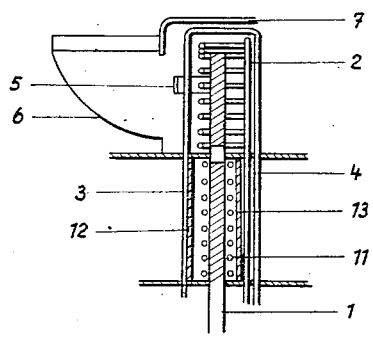
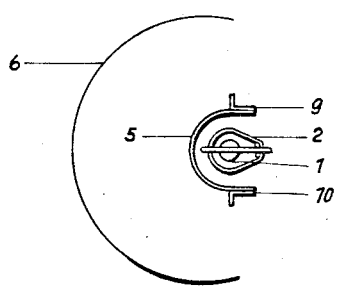
Fig. 2
Fig. 4
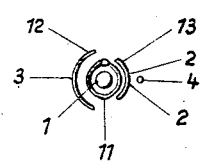
Fig. 5    Fig. 6    Fig. 7    Fig. 8    Fig. 9
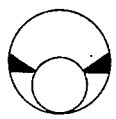 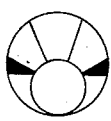 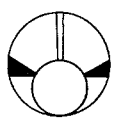  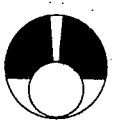
Fig. 10    Fig. 11    Fig. 12    Fig. 13    Fig. 14
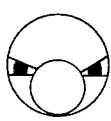 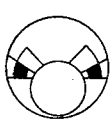 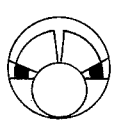  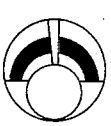
INVENTOR
ALBERT LIEB
Philip M. Bolton
BY     ATTORNEY

United States Patent Office 2,799,790
Patented July 16, 1957

2,799,790
MULTI-RANGE VOLTAGE INDICATING VALVE

Albert Lieb, Oberesslingen, Wurttemberg-Baden, Germany, assignor to International Standard Electric Corporation, New York, N. Y., a corporation of Delaware Application May 16, 1952, Serial No. 288,351

Claims priority, application Germany May 19, 1951

4 Claims. (Cl. 313—107.5)

The present invention relates to multirange voltage indicating valves of a type usually used in amplitude-modulated receivers.

For increasing the sensitivity of multi-range voltage indicating valves in a range-of-voltage as large as possible, two indicating valves are employed which are each connected to an amplifier system. The amplifier systems thereby are designed in such a way that one system is of a small mutual conductance and, therefore, has a larger range of modulation than the other one and that every indicating system influences a special spot of light or angular range on the anode which is common to both indicating systems. The control electrodes of the hitherto known multi-range indicating valves, influencing the fluorescent pattern, are arranged about the cathode-circumference so that each control electrode uses a certain sector for the voltage indication, separated from the others, preferably however, an angular range of the luminous anode.

The present invention aims to solve the problem of achieving an improvement of this kind of indicating valves regarding the sensitivity and the better recognizability of the actual voltage condition. According to the invention, this is achieved using the same luminous screen surface for both ranges of sensitivity and in the spots of light, influenced by the different control electrodes, cover each other entirely or in part. First the more sensitive indicating system starts to operate and only when the entirely available luminous angle is illuminated by this system, the second system starts to operate upon a further increase of voltage. Contrary to the hitherto known multi-range voltage indicating valves, this system has the advantage, that the voltage amplitude of the different ranges of sensitivity is indicated in the same angular range of the luminous screen. The covering of the angular ranges of the luminous screen, influenced by the individual deflecting systems, is achieved by special optico-electronical arrangements located between the luminous anode and the deflecting electrodes. The control electrodes are not, as up to now, distributed around the cathode circumference, but lie in a plane through the cathode axis.

The invention will be particularly described with reference to the embodiments represented in the accompanying drawings, in which:

Fig. 1 shows a schematic partial section through the embodiment of a valve according to the present invention, Fig. 2 shows the schematic top view of Fig. 1, Fig. 3 is the schematic partial section of a modified embodiment in which the same indicating systems are employed as in Figs. 1 and 2, but exhibiting a special arrangement of the amplifier systems, Fig. 4 is the schematic top view of Fig. 3, Figs. 5 through 9 show the fluorescent patterns which may be obtained by means of the examples of embodiment of the valve according to the invention, Figs. 10 through 14 gives some examples of those fluorescent patterns which are obtained when employing another embodiment of the valve according to the present invention.

In Figs. 1 and 2 of the drawings, reference numeral 1 denotes the axial cathode surrounded by an indicating grid 2 and a luminous screen 6. The luminous picture appearing on the screen will be influenced by the control electrodes 3 and 4, located in a plane through the cathode axis, and which in preference exhibit the form of round props. Electrode 4 exhibits in Fig. 1 the form of a hairpin-shaped curved prop; but may be, however, also of any other shape. The arrangement of the indicating system has been made so, that this prop can only intercept current from that part of the cathode, from which an inducement of the luminous picture appears. In the present case this is achieved thereby, that this prop lies in the shadow of the props or supports of indicating grid 2. These props 3 and 4 are separated from each other approximately in the centre height of the luminous screen. This separating point is surrounded along that part of the cathode circumference necessary for the illumination of the luminous screen, by counterelectrode 5. To this counterelectrode is preferably applied a voltage, which is positive in relation to the cathode for instance, to the luminous screen voltage. It may also be applied, as may be seen from Figs. 1 and 2, to the angular-shaped pieces of sheet metal 9 and 10, acting as deflecting electrodes. As known, the deflecting electrodes 9 and 10 serve the enlargement of the maximum shadow-angle of the produced luminous pattern. The covering of the luminous pictures, generated by the deflecting electrodes 3 and 4, is achieved by the special electric field, spreading between counterelectrode 5 and the upper cover-edge 8, and the lower edge of the luminous screen respectively. By a suitable arrangement of the separating point of the two electrodes 3 and 4 and also of counterelectrode 5, e. g. by a suitable choice of the voltage of this electrode, the complete or partly covering of the luminous pictures of the individual deflecting systems will be achieved. It follows that also the covering of the illuminated angular range may either be partly or completely.

Figures 3 and 4 show modified embodiments for the amplifier systems. In this case the amplifiers are not arranged spaced above each other in the conventional manner but next to each other around the cathode. The controlling of the more sensitive indicating system, in Figs. 3 and 4, is performed via the amplifier system associated to anode 12, and for the less sensitive system via the amplifier system of anode 13. Both amplifier systems have a common control grid 11, which will be connected to the voltage to be indicated. The number of windings of this grid, or the space between grid and cathode may in the different amplification systems, produce different values, as desired. In the embodiments of Figs. 3 and 4, the deflecting electrodes 3 and 4 of the indicating systems may be designed in a way to be used at the same time as anodes for the amplifier systems.

It is self-evident, that the number of the controllable indicating systems can be increased; thus it is possible, for instance, to arrange three systems without great difficulties. Furthermore it is possible, for the purpose of saving filament output, to arrange the amplifier systems in a known manner around the cathode circumference, which is not utilized by the indicating systems.

Figs. 5 through 14 are some examples of fluorescent patterns obtained at different voltage indicating values. In Figs. 5 through 9 the luminous pictures of the individual deflecting systems cover each other completely, whereas Figs. 10 through 14 show luminous pictures in which those ones, generated by the individual deflecting systems, are only covered partly, due to a suitable selection of voltage for the covering electrode 5, or to the suitable arrangement and fashioning of this particular electrode. The schematic representation of the fluorescent patterns as shown in Figs. 5 through 14, is made in such a manner, that the non-luminous parts of the screen are illustrated in white, those parts of the luminous screen which are excited by one indicating system, are illustrated in grey and that those parts of the luminous screen which are excited at the same time by two indicating systems, are represented in dark black colors. It is obvious that those parts of the luminous screen, which are excited by both of the indicating systems, are lighted up much brighter. Hence, are those parts which are represented in dark black. Figs. 5 and 10 show the luminous picture in a state when no transmitter energy comes in. Figs. 6 and 11 show the luminous pictures at only a small incidence of transmitter energy, so that only the more sensitive indicating system responds. In Figs. 7 and 12 the luminous pictures are represented in the state of such a great incidence of transmitter energy, that just the more sensitive indicating system is completely modulated, whereas the less sensitive one has not yet come into action. In Figs. 8 and 13, finally, the insensitive indicating system operates and in Figs. 9 and 14 it is completely modulated.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A tuning indicator tube having within its envelope an elongated cathode, a fluorescent target, means including a first elongated control electrode for controlling the luminescence over a given area of said target, means including a second elongated control electrode for controlling the luminescence over the same given area of said target, said first and second elongated control electrodes mounted in end to end relation between the cathode and the target to leave a gap between the ends and lying in a common plane with the cathode, said plane extending across substantially the middle of said target, and a counterelectrode spaced from and mounted between said control electrodes and said target in a position to bridge said gap.

2. A tuning indicator tube according to claim 1 further including a pair of anodes mounted opposite a length of said cathode separate from that in the indicator system, each of said anodes facing a different portion of the perimeter of said cathode along substantially the same said length thereof, grid means interposed between said length of cathode and said anodes thereby forming a pair of separate amplifiers, said grids and anodes being differently spaced to provide different amplification factors for each of said amplifiers, and means connecting the anode of each of said amplifiers to a separate one of said elongated control electrodes.

3. A tuning indicator tube according to claim 2 wherein said grid means consists of a first grid portion between one of said anodes and the cathode and a second grid portion between said cathode and the other of said anodes, said grid portions being connected together.

4. A tuning indicator tube according to claim 1 wherein said fluorescent target is dish shaped in the form of substantially half a hemisphere.

References Cited in the file of this patent

UNITED STATES PATENTS

| | | |
|---|---|---|
| 2,243,408 | Anderson | May 27, 1941 |
| 2,273,142 | Roberts | Feb. 17, 1942 |
| 2,273,800 | Schleimann-Jensen | Feb. 17, 1942 |
| 2,486,814 | Bachman | Nov. 1, 1949 |
| 2,513,908 | Bailey | July 4, 1950 |
| 2,712,612 | Lieb | July 5, 1955 |